United States Patent Office 2,841,590
Patented July 1, 1958

2,841,590
INDOLE DERIVATIVES

Robert Michel Jacob, Ablon-sur-Seine, and Naoum Mayer Messer, Paris, France, assignors to Societe des Usines Chimiques Rhone-Poulenc, Paris, France, a French body corporate No Drawing. Application March 11, 1957
Serial No. 644,988

Claims priority, application France March 19, 1956

5 Claims. (Cl. 260—319)

This invention is for improvements in or relating to indole derivatives and has for its object to provide new indole derivatives having useful therapeutic properties.

The new indole derivatives of the present invention consist of the compounds of the following general Formula I:

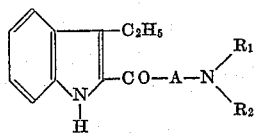

in which A represents a single bond or an —NH— group, and $R_1$ and $R_2$ are the same or different and represent hydrogen atoms or methyl groups.

According to a feature of this invention, the aforesaid new indole derivatives are prepared by the action of ammonia, a hydrazine or mono- or dimethylamine on a suitable derivative of 3-ethylindole-2-carboxylic acid such, for example, as the acid chloride, the azide or an ester. The reaction is carried out under the conditions normally employed for the conversion of a carboxylic acid derivative into the corresponding amide or hydrazide.

The new compounds of the invention are particularly active anti-convulsants and medullary depressants. The latter property may be demonstrated, for example, in terms of antagonistic action against strychnine [cf. for example F. M. Berger, Pharmaceutical Reviews 1, 274 (1949)]. They are also active, when used in sufficiently high dosage, as potentiators of narcosis. They may be used as non-hypnotic sedatives, in particular in the treatment of anxiety states and of nervous tension. Because of their sedative properties, they may also have a favourable effect in the treatment of hypertension. Individual compounds of outstanding importance are: 3-ethylindole-2 - carboxylic acid hydrazide, 3 - ethylindole - 2 - carboxylic acid dimethylamide, 3-ethylindole-2-carboxylic acid monomethylamide, and 3-ethylindole-2-carboxylic acid amide.

The invention is illustrated by the following examples; the melting points given were determined on the Kofler bench.

Example I

Ethyl 3-ethylindole-2-carboxylate (51 g.) and hydrazine hydrate (120 cc.) are heated under reflux for 3 hours. On cooling the solid is separated, washed with water (4 x 125 cc.) and dried in vacuo. 3-ethylindole-2-carboxylic acid hydrazide (46.5 g.) is obtained, M. P. 183° C.

Ethyl 3-ethylindole-2-carboxylate (M. P. 124° C.) is obtained by the action of benzenediazonium chloride on ethyl α-acetylvalerate in alcoholic potash [Burton, Am. Chem. Journ. 3, 385 (1881)].

Example II

A solution in ether of 3-ethylindole-2-carboxylic acid azide is prepared by the action on 3-ethylindole-2-carboxylic acid hydrazide (34 g.) (obtained as in Example I) in dioxane (750 cc.) of sodium nitrite (12 g.) dissolved in water (150 cc.) folowed by N hydrochloric acid (20 cc.), the temperature being maintained at about +4° C., followed by dilution with water (1500 cc.) and dissolution of the solid in ether (300 cc.). To the solution thus obtained a solution of dimethylamine (150 g.) in ether (500 cc.) is then added with stirring, the temperature being kept at about 0° C. The mixture is stirred for one hour and allowed to stand overnight at 0° C. The ethereal solution is shaken with a saturated aqueous solution of sodium bicarbonate (300 cc.), chloroform (300 cc.) is added and the organic layer is separated, washed with water and dried over potassium carbonate. After evaporating off the solvent, the residue is dissolved in boiling benzene (100 cc.), hot n-heptane (100 cc.) is added and the solution is left to crystallise. The crystals are separated, washed with heptane and dried in vacuo. 3 - ethylindole - 2 - carboxylic acid dimethylamide (22.5 g.) is thus obtained, M. P. 154° C.

Example III

Proceeding as in Example II, but starting with 3-ethylindole-2-carboxylic acid hydrazide (12.2 g.) and monomethylamine (50 g.), 3 - ethylindole - 2 - carboxylic acid monomethyl amide (8.5 g.) is obtained, M. P. 186° C.

Example IV 3-ethylidole-2-carboxylic acid (18.9 g.) is added in small portions at ordinary temperature to a solution of thionyl chloride (13.1 g.) in toluene (50 cc.). The mixture is agitated at 25° C. for 30 minutes and then heated slowly to a temperature of 76° C. A clear solution is obtained which is cooled to about +5° C. Liquid dimethylamine (27 g.) is then added drop by drop, the temperature being kept at +5° C. by cooling. The mixture is left overnight in the refrigerator. The crystalline product is separated off, washed first with toluene and then with a large quantity of water. The product is dried and 3-ethylindole-2-carboxylic acid dimethylamide (16 g.), M. P. 152–153° C., is thus obtained. By evaporation of the toluene solutions a second crop (4 g.), M. P. 150–151° C., is obtained. After recrystallisation from benzene a pure product (17 g.), M. P. 154° C., is obtained.

Example V

Proceeding as in Example III but replacing monomethylamine by ammonia (20 g.), there is obtained 3-ethylindole-2-carboxylic acid amide (5.6 g.), M. P. 134 ° C. followed by resolidification and a second M. P. at 140° C.

We claim:
1. As a new composition of matter a member of the class consisting of the indole derivatives of the formula:

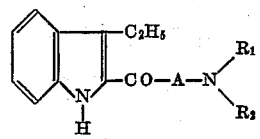

in which A is a member of the class consisting of a single bond and the —NH— group, and $R_1$ and $R_2$ are each members of the class consisting of hydrogen atoms and methyl groups.
2. 3-ethylindole-2-carboxylic acid hydrazide.
3. 3-ethylindole-2-carboxylic acid dimethylamide.
4. 3-ethylindole-2-carboxylic acid monomethylamide.
5. 3-ethylindole-2-carboxylic acid amide.

References Cited in the file of this patent
Kornfeld: J. Org. Chem., vol. 16, pages 806–9, 1951.